United States Patent
Reding et al.

(10) Patent No.: US 7,254,220 B1
(45) Date of Patent: Aug. 7, 2007

(54) METHODS AND APPARATUS FOR OBTAINING AND DISTRIBUTING VOICE MAIL INFORMATION

(75) Inventors: Craig L. Reding, Midland Park, NJ (US); John R. Reformato, East Meadow, NY (US); Jayant M. Naik, Stamford, CT (US)

(73) Assignee: Telesector Resources Group, Inc., New York, NY (US)

( * ) Notice: Subject to any disclaimer, the term of this patent is extended or adjusted under 35 U.S.C. 154(b) by 1091 days.

(21) Appl. No.: 09/828,679

(22) Filed: Apr. 6, 2001

Related U.S. Application Data (60) Provisional application No. 60/269,338, filed on Feb. 16, 2001.

(51) Int. Cl.
*H04M 1/64* (2006.01)

(52) U.S. Cl. ............ 379/88.17; 379/88.19; 379/88.23; 370/356

(58) Field of Classification Search ......... 379/88.12, 379/88.13, 88.17, 88.18, 88.22, 88.19, 88.23; 370/356, 352; 709/229
See application file for complete search history.

(56) References Cited

U.S. PATENT DOCUMENTS

| | | | |
|---|---|---|---|
| 5,568,540 A | 10/1996 | Greco et al. | |
| 5,608,786 A | 3/1997 | Gordon | |
| 5,608,874 A | 3/1997 | Ogawa et al. | |
| 5,675,507 A | 10/1997 | Bobo, II | |
| 5,717,742 A | 2/1998 | Hyde-Thomson | |
| 5,754,636 A | 5/1998 | Bayless et al. | |
| 5,870,454 A | 2/1999 | Dahlén | |
| 5,870,549 A | 2/1999 | Bobo, II | |
| 5,925,101 A | 7/1999 | Bayless et al. | |
| 5,951,638 A | 9/1999 | Hoss et al. | |
| 5,958,016 A | * 9/1999 | Chang et al. | 709/229 |
| 5,991,382 A | 11/1999 | Bayless et al. | |
| 6,026,158 A | 2/2000 | Bayless et al. | |
| 6,047,054 A | 4/2000 | Bayless et al. | |
| 6,061,718 A | 5/2000 | Nelson | |
| 6,078,582 A | * 6/2000 | Curry et al. | 370/356 |
| 6,085,231 A | 7/2000 | Agraharam et al. | |
| 6,100,873 A | 8/2000 | Bayless et al. | |
| 6,134,313 A | 10/2000 | Dorfman et al. | |
| 6,138,036 A | 10/2000 | O'Cinneide | |

(Continued)

OTHER PUBLICATIONS

G. Vaudreuil and G. Parsons, Network Working Group Request for Comments: 2421, "Voice Profile for Internet Mail—version 2", Sep. 1998, downloaded from: http://www.ietf.org/rfc/rfc2421.txt?number=2421 on Jan. 29, 2001, pp. 1-56.

*Primary Examiner*—Gerald Gauthier (57) ABSTRACT

SMDI messages are used by the SMDI message server to generate either E-mail notifications of received messages which are forwarded to a user of the VMS or to supply VMS message status information to a voice message retrieval and forwarding system using IP messaging instead of SMDI FSK or PSK signaling. SMDI messages between a stored program controlled switching system, e.g., C.O. switch, and a voice message system are monitored by the SMDI message server of the present invention, e.g., by inserting a Tee into the SMDI link between the C.O. switch and VMS. The SMDI message server uses the directory number information and/or a message line identifier included in a received SMDI message to identify a subscriber or voice message retrieval and forwarding system which should be notified of the received SMDI message information.

32 Claims, 8 Drawing Sheets

U.S. PATENT DOCUMENTS

| | | |
|---|---|---|
| 6,138,096 A | 10/2000 | Chan et al. |
| 6,138,146 A | 10/2000 | Moon et al. |
| 6,148,329 A | 11/2000 | Meyer |
| 6,151,491 A | 11/2000 | Farris et al. |
| 6,154,465 A | 11/2000 | Pickett |
| 6,161,007 A | 12/2000 | McCutcheon et al. |
| 6,167,253 A | 12/2000 | Farris et al. |
| 6,173,259 B1 | 1/2001 | Bijl et al. |
| 6,175,616 B1 | 1/2001 | Light et al. |
| 6,175,858 B1 | 1/2001 | Bulfer et al. |
| 6,215,858 B1 * | 4/2001 | Bartholomew et al. .. 379/88.17 |
| 6,272,126 B1 * | 8/2001 | Strauss et al. ........... 379/88.17 |
| 6,359,880 B1 * | 3/2002 | Curry et al. ................ 370/352 |
| 6,389,115 B1 * | 5/2002 | Swistock ................ 379/88.12 |
| 6,389,276 B1 * | 5/2002 | Brilla et al. ............. 379/88.12 |
| 6,404,858 B1 * | 6/2002 | Farris et al. ............. 379/88.19 |
| 7,023,967 B1 * | 4/2006 | Andersson et al. ...... 379/88.12 |

* cited by examiner

METHODS AND APPARATUS FOR OBTAINING AND DISTRIBUTING VOICE MAIL INFORMATION

RELATED APPLICATIONS

The present application claims the benefit of U.S. Provisional Application Ser. No. 60/269,338, filed on Feb. 16, 2001.

FIELD OF THE INVENTION

The present invention is directed to communications systems and, more particularly, to methods and apparatus for obtaining and distributing voice message status information and to controlling voice message systems.

BACKGROUND OF THE INVENTION

Voice message systems (VMSs), e.g., answering machines and voice mail systems, are commonplace in the modern communications oriented world.

Most VMSs allow a user to obtain message status information by calling the voice messaging system and then entering a mailbox (or account) identifier, a password and/or control signals, e.g., DTMF tones. The retrieval of message status information in this matter represents a polling operation wherein the VMS is periodically contacted and checked for waiting message information.

While polling a VMS for message waiting information is acceptable in many applications, e.g., in the case of home answering machines, a better approach is to provide a user of a VMS a positive indicator of a waiting message without the user having to check for the message. A frequently encountered example of such an indicator is a message waiting light on a telephone which is activated when a message is left for a VMS user and deactivated when the message is accessed or deleted.

Centrex is a telephone service whereby a telephone company associates several independent telephone lines together to provide PBX type functionality, e.g., telephone extension dialing, call forwarding, etc. Centrex features are provided through control of telephone lines and calls using software and a switch located at a telephone central office. For each Centrex subscriber, a separate call processing record is maintained and telephone services are provided according to the information in the call processing record.

Voice mail is sometimes provided as a Centrex service. To provide voice mail to Centrex subscribers, a voice mail system is often located in a telephone office and coupled to the central office switch used to service Centrex subscribers.

A signaling protocol, referred to as the Simplified Message Desk Interface (SMDI), described in Telecordia Technologies document titled "Simplified Message Desk Interface (SMDI)", Generic Requirements GR-283-CORE, Issue 1, November 1999 was developed to support basic signaling of information between a message storage and retrieval system (MSRS), e.g., a voice message system (VMS), and a stored program controlled switching (SPCS) system such as a central office (C.O.) switch of the type used to provide Centrex service. The SMDI interface uses Frequency Shift Keying (FSK), Phase Shift Keying (PSK) and/or other analog signaling techniques for transmission of information according to an asynchronous serial data transmission protocol. In accordance with the SMDI protocol each word of a SMDI message consists of a start bit (space), a 7-bit standard ASCII character, an even parity bit and a stop bit (mark).

Figure 1:
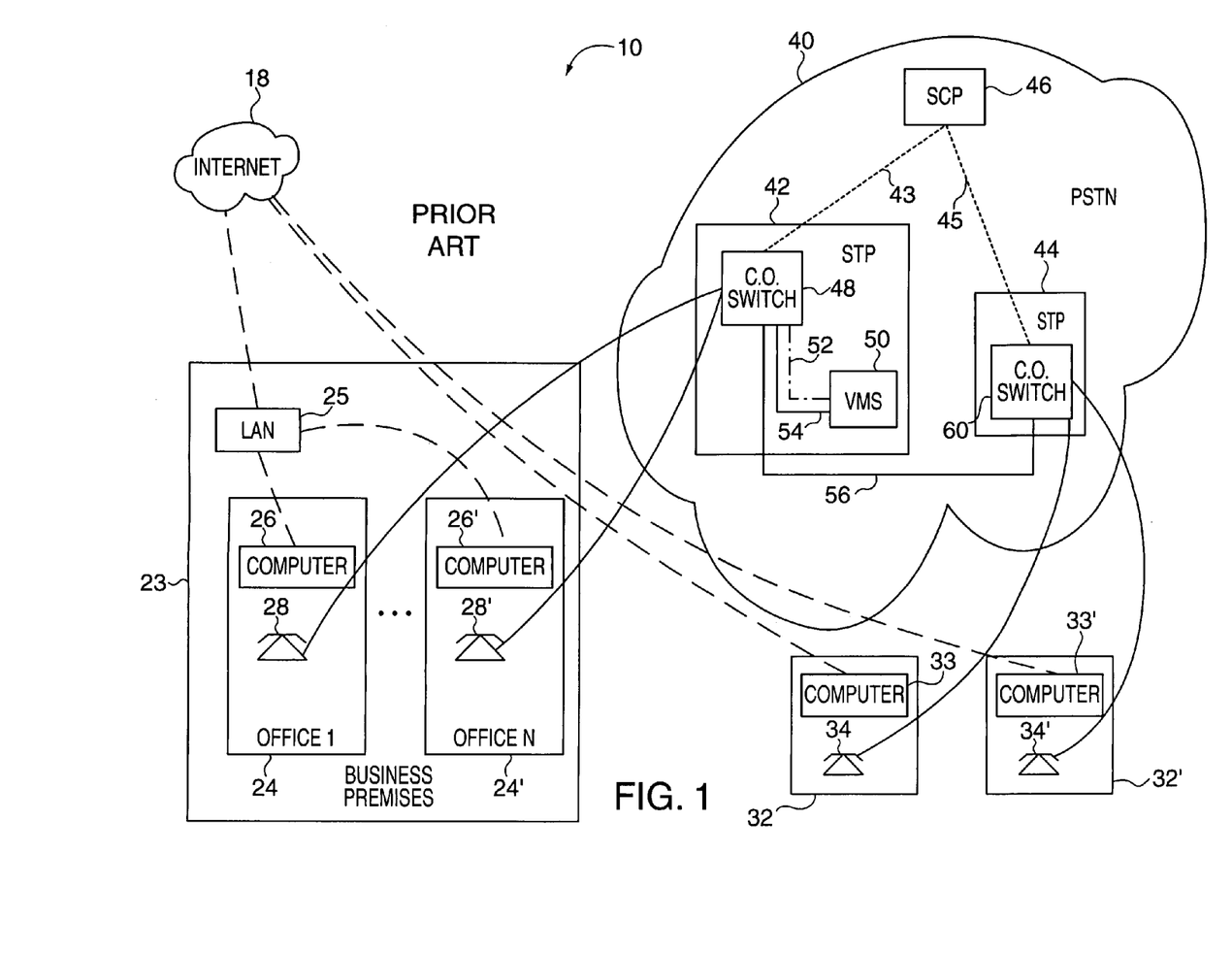
FIG. 1 illustrates a known communications system which includes a SMDI link for providing a C.O. switch with message waiting status information.

FIG. 1 illustrates a known prior art communications system 10. The communications system 10 includes a public switched telephone network 40, a business premise 23, and a plurality of residential premises 32, 32', and the Internet 18. The business premise 23 includes multiple offices 24, 24'. Each office includes a computer 26, 26'. Computers 26, 26' are coupled together and to the Internet 18 by a local area network (LAN) 25. The offices 24, 24' also include telephones 28, 28' coupled to a first C.O. switch 48 of the PSTN 40. Telephones 34, 34', in residential premises 32, 32', are coupled to a second C.O. switch 60 of the PSTN 40.

The first and second C.O. switches 48, 60 are located in first and second central offices 42, 44 which are coupled together by a high bandwidth communications channel 56, e.g. a fiber optic link. The PSTN 40 includes a service control point (SCP) 46 which stores customer information, e.g., Centrex call processing records (CPRs), used to provide telephone services to subscribers. The SCP 46 is coupled to the first and second C.O. switches 48, 60 via data lines 43, 45.

In order to provide voice messaging services to Centrex service subscribers coupled to the first C.O. switch 48, a voice messaging system (VMS) 50 is coupled to the C.O. switch 48 via a voice channel 54 and a SMDI link 52. Calls to VMS service subscribers which go unanswered for a preselected period of time are supplied to the VMS 50 where the caller is provided the opportunity to leave a message for the called party. The SMDI link 52 is used to convey call data, in the form of SMDI history messages, from the C.O. switch 48 to the VMS 50. The SMDI link 52 is also used to convey message waiting indicator (MWI) control messages from the VMS 50 to the C.O. switch 48.

Figure 2:
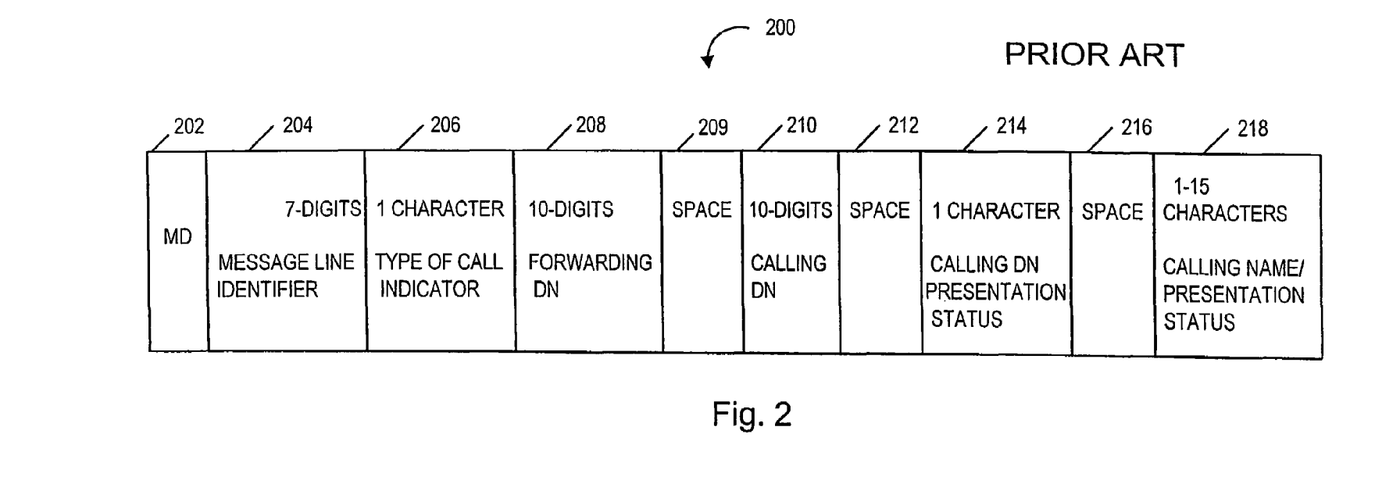
FIG. 2 illustrates the format of a SMDI history message.

In particular, when an unanswered call is delivered to the VMS 50, the C.O switch 48 transmits a SMDI call history message to the VMS over the SMDI link 52. FIG. 2 illustrates the format for a standard SMDI history message 200.

The call history message 200 begins with the alphabetic characters MD 202. A 7-digit message line identifier (MLI) 204 follows. The MLI 204 identifies the line to which an incoming call is terminated. It can be, e.g., a 7-digit directory number (DN) assigned to the PSTN or a 7-digit number made up of multi-line hunt group (MLHG) identifier and MLHG position identifier. MLI 204 is followed by a 1 character call type identifier 206 which indicates the reason the call was directed to the VMS. A 10-digit forwarding DN 208 is included in the message 200 when the call has been forwarded. Thus, the forwarding DN 208 is omitted in the case of direct calls. A space 209 separates the forwarding DN 208 from a calling DN number 210. The calling DN 208 is followed by a space and a 1 character calling presentation status field 214. The field 214 is followed by another space 216. A calling name/presentation status field 218 is used to provide the name of the calling party which is obtained when available using known techniques. Some of the information fields may be omitted from the call history message 200 depending on the nature of the call being connected to the VMS 50 and the availability of information to populate the fields.

Figure 3:
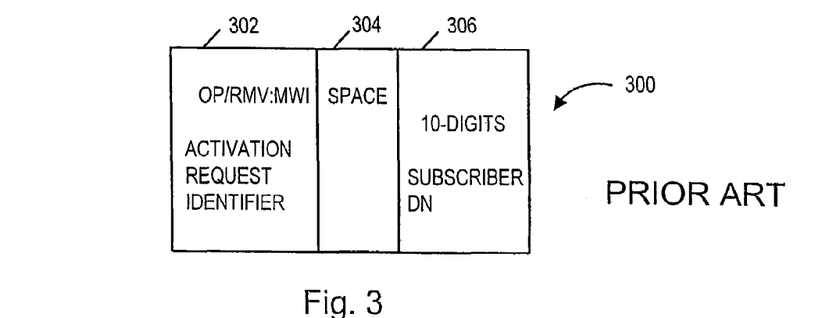
FIG. 3 illustrates the format of SMDI MWI control messages.

FIG. 3 illustrates the format of a SMDI MWI control message 300. The message 300 includes an activation request identifier field 302, a space 304 and a subscriber directory number field 306. The activation request identifier field 302 includes the characters OP or RMV to indicate whether the message waiting indicator should be activated ("operated") or de-activated ("removed"). The subscriber DN field includes a 10-digit directory number which is used to indicate the subscriber whose message waiting indicator is to be controlled. SMDI MWI control messages 300 are terminated by a "!" and a Control D character (not shown).

Use of voice messing IPs such as the VMS 50 is not limited to Centrex applications. The VMS 50 can be used to provide voice messaging services to residential telephone service customers such as users of telephones 34, 34'. Unfortunately, most residential voice messaging service subscribers lack telephones with message waiting lights which are capable of being activated by a C.O. switch.

One of the advantages of Centrex is that it can be used with standard telephones thereby allowing businesses to avoid the investment in more costly phones which support features such as message waiting lights. Accordingly, many business subscribers to voice messaging services provided by telephone companies find themselves confronted with having to call the VMS 50 to check for messages even though the VMS 50 supports a SMDI link 52 to the C.O. switch 48.

In view of the above, it becomes apparent that there is a need for improved methods and apparatus notifying voice messaging service subscribers of waiting messages. It is desirable that at least some notification methods be supported which do not require a subscriber to poll a VMS to be notified of waiting messages. It is also desirable that at least some notification methods be supported which can be used with existing voice messaging systems, e.g., systems which support the use of SMDI. It is further desirable that new message notification methods and apparatus not interfere with existing C.O. notification via the control of message waiting lights on telephones which support such functionality.

SUMMARY OF THE INVENTION

The present invention is directed to methods and apparatus for obtaining and distributing voice message status information and to controlling voice message systems.

In accordance with the present invention, SMDI messages between a stored program controlled switching system (SPCS), e.g., central office switch, and a message storage and retrieval (MSR) system, e.g., voice message system (VMS), are monitored by a SMDI message server of the present invention.

The SMDI message server detects SMDI messages without interfering with the communication of the messages between the C.O. switch and VMS. The messages are processed and used to generate either E-mail notifications of received messages which are forwarded to a user of the VMS or to supply message status information to a voice message retrieval and forwarding system using IP messaging including IP packets instead of SMDI FSK or PSK signaling. The IP messages generated and transmitted to a VMRAF system may include information from both SMDI MWI control messages and SMDI history messages. In this manner, the VMRAF system can be supplied with information on the identity of the party who left a message which might not be available directly from the VMS at the time the message is retrieved by the VMRAF system.

In accordance with the present invention information for SMDI message server users, and/or VMRAF service subscribers, is stored in a service control point (SCP) and downloaded to the VMRAF system and SMDI message server. The subscriber information downloaded from the SCP to the SMDI message server may include the E-mail address of the subscriber, the subscriber's DN, information on whether or not the subscriber is a VMRAF service subscriber and, for VMRAF service subscribers, the IP address of the VMRAF system.

Information downloaded from the SCP to a VMRAF system may include the DNs of VMRAF service subscribers and the E-mail address to which voice messages in the form of audio files may be forwarded using IP packets.

Since the SMDI message server and VMRAF system of the present invention can be used without interfering with the normal operation and SMDI messaging of known voice messaging systems, the SMDI message server and VMRAF system of the present invention can often be added to existing communications systems without the need to make expensive and costly modifications to existing hardware.

Various additional features and advantages of the present invention will be apparent from the detailed description which follows.

DETAILED DESCRIPTION

As discussed above, the present invention is directed to methods and apparatus for obtaining and distributing voice message status information and to controlling voice message systems.

Figure 4:
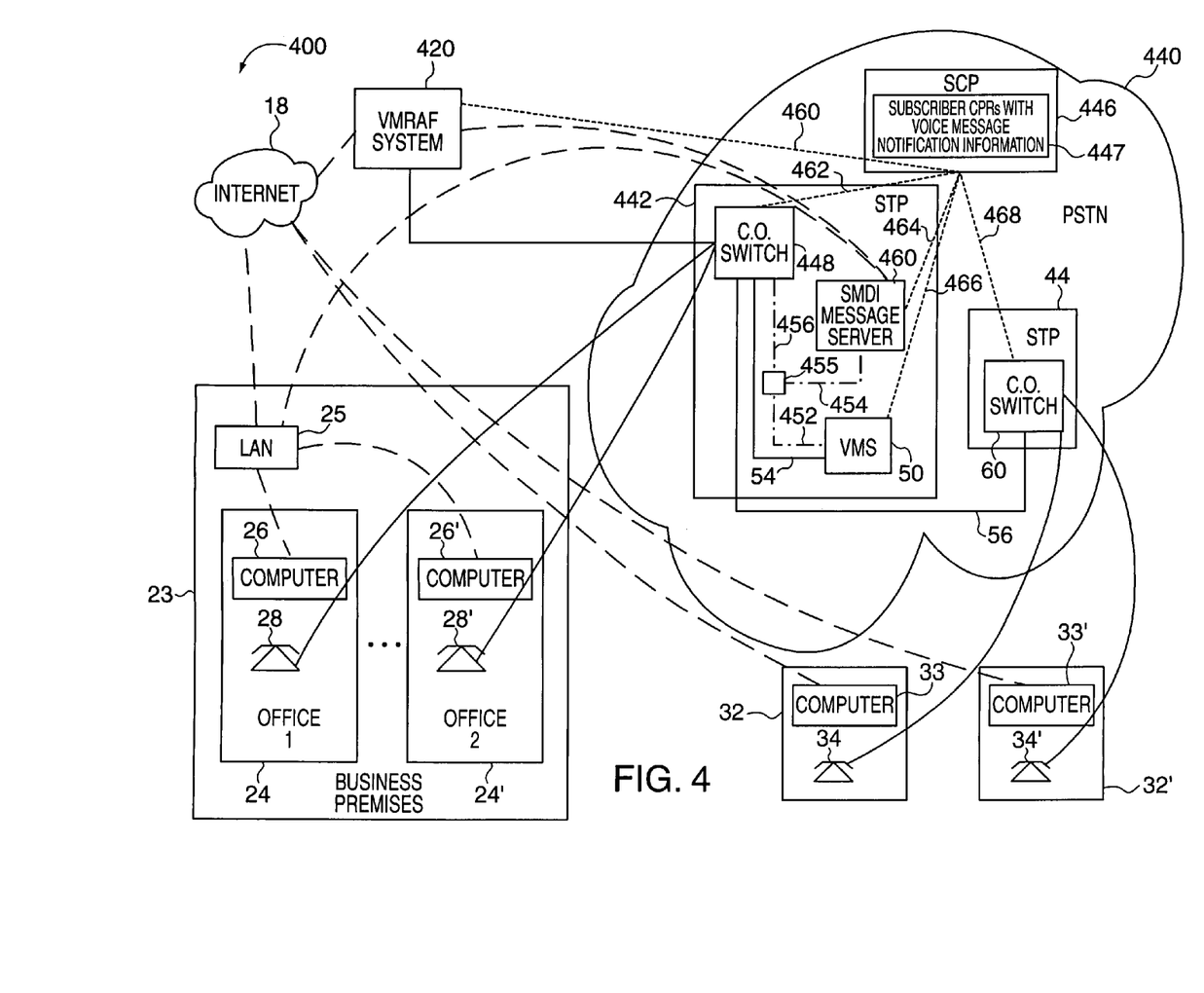
FIG. 4 illustrates a communications system implemented in accordance with the present invention, which supports advanced voice message notification and retrieval features.

FIG. 4 illustrates a communications system 400 implemented in accordance with the present invention. Various elements of the system 400 may be implemented using elements which are the same as, or similar to, the elements of the known system 10. Such elements are identified in FIG. 4 using the same names and reference numbers as used in FIG. 1. For the purposes of brevity, such elements will not be described again in detail.

As illustrated in FIG. 4, the communication system 400 includes the Internet 18, business premises 23, residential premises 32, 32', the public switched telephone network (PSTN) 440, and a voice message retrieval and forwarding (VMRAF) system 420 which are coupled together as illustrated.

Figure 5:
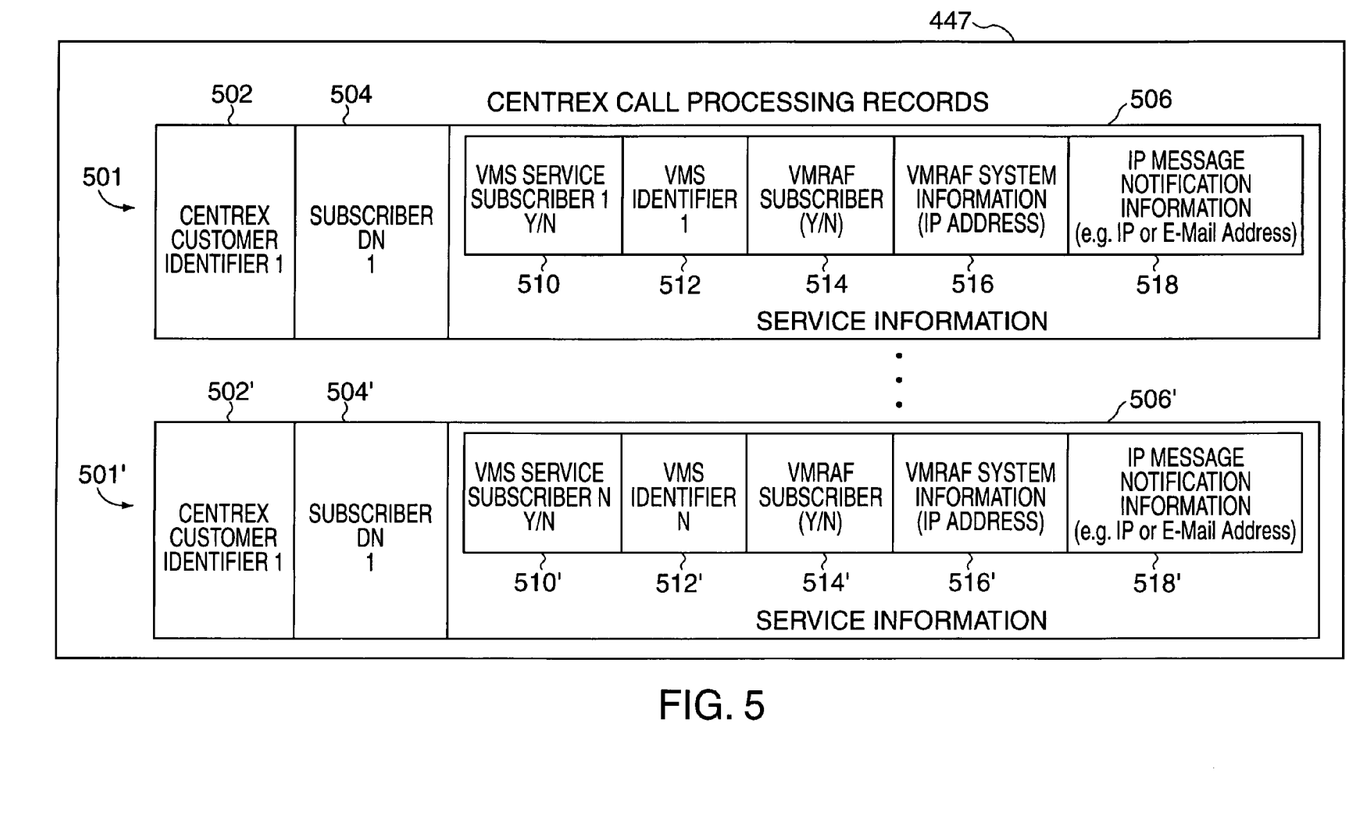
FIG. 5 illustrates a set of exemplary Centrex call processing records which may be used in the system of FIG. 4.

The PSTN 440 includes a service control point (SCP) 446 which is coupled to first and second signal transfer points 442, 444. The SCP 446 includes a set 447 of Centrex subscriber call processing records. The call processing records, in accordance with the present invention, include voice message notification information, as well as other information. FIG. 5 illustrates an example of the set 447 of call processing records.

As illustrated in FIG. 5, the set 447 includes a call processing record 501, 501' for each one of the N Centrex subscribers serviced by SCP 446. Each call processing record includes a Centrex customer identifier 502, 502', the subscriber's directory number 504, 504' and a set of service information 506, 506'. In accordance with the present invention, the service information includes information 510, 510' indicating whether or not the subscriber is a VMS service subscriber.

In addition, for VMS service subscribers, a VMS identifier 512, 512' is included which indicates the VMS assigned to provide voice messaging services to the subscriber. Also included in the service information 514, 514' is information which indicates whether the Centrex subscriber is also a voice message retrieval and forwarding (VMRAF) service subscriber. For VMRAF service subscribers, VMRAF system information 516, e.g., the IP address of the VMRAF system which provides services to the subscriber, is included in the service information 506. Also included in each CPR is an E-mail address 518 where the VMRAF system can E-mail voice messages and/or E-mail notifications of waiting voice messages can be sent by the SMDI message server.

Referring once again to FIG. 4, STP 44 includes a central office switch 60 as in the known system 10. However, STP 442 is implemented in accordance with the present invention, and includes a C.O. switch 448, a voice messaging system (VMS) 50 and a SMDI message server 460 and an RS-232 tee 455.

Tee 455 is used to tap the SMDI link comprising segments 452, 456 between VMS 50 and C.O. switch 448 without interfering with communications over the SMDI link. Thus, by way of tee 455 and segment 454, the SMDI message server 460 is supplied with the SMDI messages communicated between VMS 50 and C.O. switch 448. The SMDI message server 460 uses the received SMDI messages to provide E-mail notifications of voice messages to voice messaging service subscribers who do not subscribe to the VMRAF service. It also uses the received SMDI messages to provide message information to the VMRAF system 420 as will be discussed below.

In the FIG. 4 embodiment, the SMDI message server 460 is shown as being coupled directly to the LAN 25 thereby allowing the SMDI message server 460 to send E-mails to computers 26, 26'. In addition, the SMDI message server is coupled to the Internet thereby permitting E-mails to be sent via the Internet 18 to, e.g., computers 33, 33'. The Internet 18 provides a connection that is well suited for sending E-mails to customers who are not directly coupled to an intranet such as a corporate LAN.

With regard to VMRAF service subscribers the SMDI message server 460 forwards SMDI message information to the VMRAF system 420 so that the system 420 can receive SMDI message information by way of the Internet or an intranet in the form of IP messages.

SCP 446 is coupled to the SMDI message server 460, the VMRAF system 420, VMS 50 and C.O. switches 448 and 44 via data network connections 460, 462, 464, 466 and 468, respectively. Thus, the SCP 446 can provide each of these devices with relevant subscriber information and configure them to provide services to individual Centrex customers as specified by each subscriber's CPR information.

In one embodiment, the SCP 446 provides the VMRAF system 420 with E-mail address information and VMS information for Centrex subscribers who are to be provided with VMRAF service. In addition to providing E-mail information to the VMRAF system, for each VMRAF service subscriber, the SCP 446 provides the SMDI message server 460 with the VMRAF service subscriber's directory number and the IP address of the VMRAF system 420 to which SMDI message information is to be forwarded by the server 460.

With regard to VMS subscribers who do not subscribe to VMRAF service, the SCP 446 provides the SMDI message server 460 with directory number and E-mail address information so that the SMDI message server 460 can send them E-mail notifications of voice messages.

The VMRAF system 420 may be the same as, or similar to, the VMRAF system described in U.S. patent application Ser. No. 09/785,223, titled "METHODS AND APPARATUS FOR IMPLEMENTING VOICE MESSAGING USING E-MAIL", filed on Feb. 16, 2001 and hereby expressly incorporated by reference. The VMRAF system 420 has the ability to retrieve voice messages from one or more voice messaging systems and forward the voice messages to a subscriber using IP packets, e.g., as E-mail file attachments. In some embodiments, the VMRAF system 420 maintains a local store of retrieved and forwarded voice messages in the event that a subscriber wishes to access the messages by phone by calling the VMRAF system 420.

In accordance with the present invention, the VMRAF system 420 is provided with SMDI message information in the form of IP messages transmitted from SMDI message server 460. Providing the VMRAF system 420 with SMDI message information avoids the need for the VMRAF system to poll the VMS 50 to determine when messages are waiting for a subscriber. The message server 460 supplies the VMRAF system with calling party information, such as the calling party's name and/or telephone number (directory number). Such information may not be directly available from the VMS 50 at the time a voice message is retrieved by the VMRAF system 420.

The VMRAF system 420 responds to the receipt of a SMDI OP MWI message information from the SMDI message server 460 by accessing the VMS 50, retrieving the message corresponding to the DN indicated in the OP MWI message information and forwarding the retrieved message to the subscriber, e.g., using the subscriber's E-mail address. In the case where SMDI history message information is received in addition to the SMDI OP MSI message information, the VMRAF system 420 will include, assuming the presentation status indicator permits presentation of the information, received calling party name and telephone number information in the E-mail message forwarding a retrieved voice message.

The VMRAF system 420 responds to the receipt of SMDI RMV MWI message information by deleting any locally stored messages, retrieved from the VMS 50, that correspond to the subscriber identified by the DN number included in a SMDI RMV MWI message.

Figure 6:
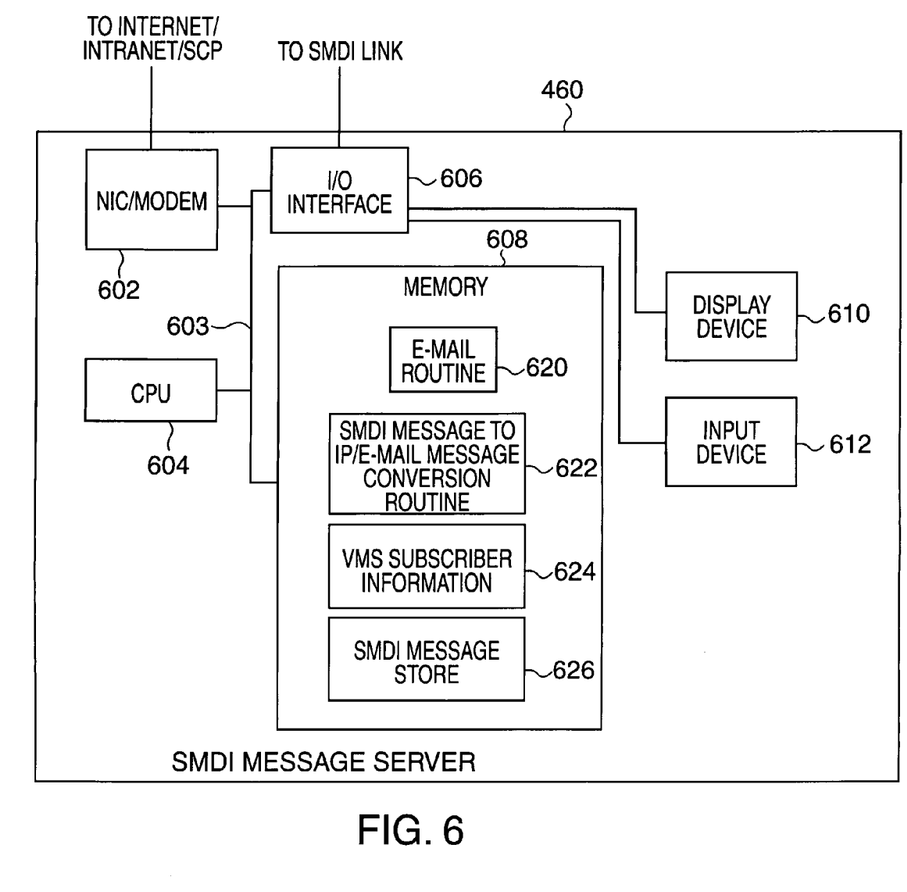
FIG. 6 illustrates a SMDI message server implemented in accordance with the present invention.

The SMDI message server 460 of the present invention will now be described in detail with reference to FIG. 6. The SMDI message server 460 includes a network interface card (NIC) and/or modem 602, input/output (I/O) interface 606, CPU 604, and memory 608 which are coupled together by bus 603. A display device 610 and input device, e.g., keyboard 612, is coupled to the other components of the SMDI message server via I/O interface 606.

The NIC/modem 602 couples the SMDI message server 460 to the Internet 18 and/or one or more intranets. The connection between the SMDI message server 460 and SCP 46 is an example of one intranet to which the NIC/modem 602 is coupled. The NIC/modem 602 allows the SMDI message server 460 to send and receive information over IP based networks such as the Internet 18. Via NIC/modem 602 and the use of IP packets to convey information, the SMDI message server 460 forwards E-mail notification of voice messages to service subscribers and sends SMDI message information to the VMRAF system 420.

In addition to allowing a system administrator to input and view SMDI message server information by way of devices 610, 612, the I/O interface 606 allows the SMDI message server to receive and, optionally, send, SMDI messages over the SMDI link connecting the C.O. switch 448 to VMS 50. To support SMDI link functionality, the I/O interface includes an FSK and/or PSK signal decoder and, in the case where SMDI signals are to be generated, an SFK and/or PSK signal encoder as well.

Memory 608 includes a SMDI message to IP/E-mail conversion routine 622 and E-mail routine 620, VMS subscriber information 624 and a SMDI message store 626. The CPU 604 controls operation of the SMDI message server 460 under the direction of one or more of the routines 622, 620 stored in the memory 608.

Figure 7:
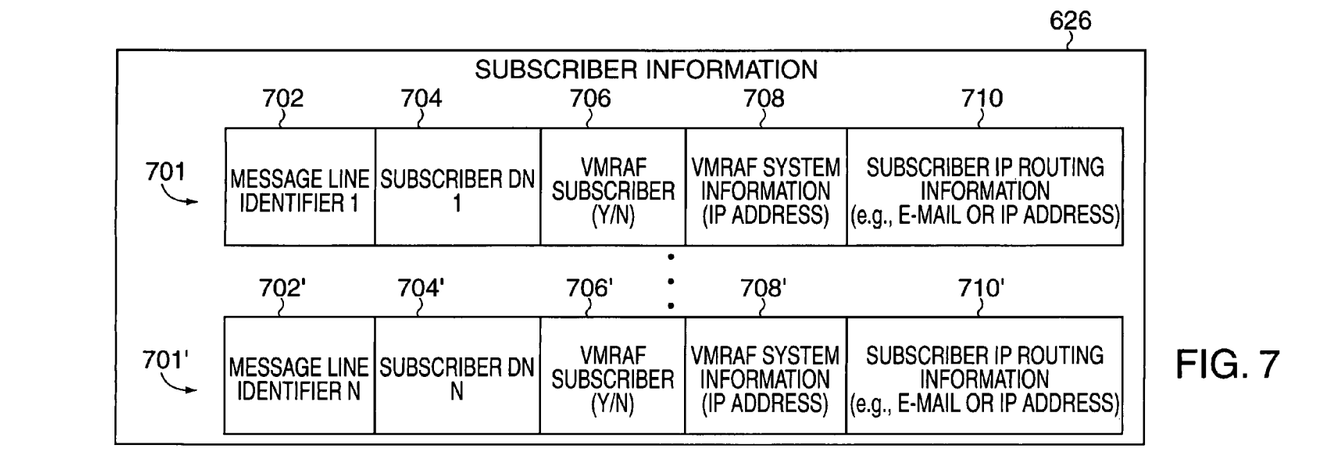
FIG. 7 illustrates a set of subscriber information which may be used by the SMDI message server of FIG. 6.

As discussed above, some or all of the information in the set of VMS subscriber information 624, may be supplied by the SCP 446. FIG. 7 illustrates an exemplary set of VMS subscriber information 626. The set of subscriber information includes an information record 701, 701' for each of the N subscribers serviced by the server 460. For purposes of explanation the information record 701 for the first subscriber will be discussed. Similar information is maintained for each of the N subscribers.

The information 701 stored for the first subscriber includes a message line identifier 702 and a subscriber DN 704. This information allows the server to associate SMDI messages with a particular subscriber by comparing the MLI or a DN included in a received SMDI message to the information in the subscriber database 626. Subscriber information 701 also includes a field 706 which indicates whether or not the subscriber is a VMRAF service subscriber. If the subscriber is a VMRAF service subscriber, another field 708 includes information, e.g., the IP address, of the VMRAF system 420 assigned to service the subscriber. The subscriber information 701 also includes subscriber IP routing information 710, e.g., the E-mail address or IP address to be used for sending E-mail messages, such as notification of voice messages, to the subscriber.

The SMDI message to IP/E-mail conversion routine 622 uses the subscriber information to determine where to send SMDI message information and in what format the information is to be transmitted, e.g., as a message to a VMRAF system 420 or as an E-mail notification to a subscriber.

Figure 8:
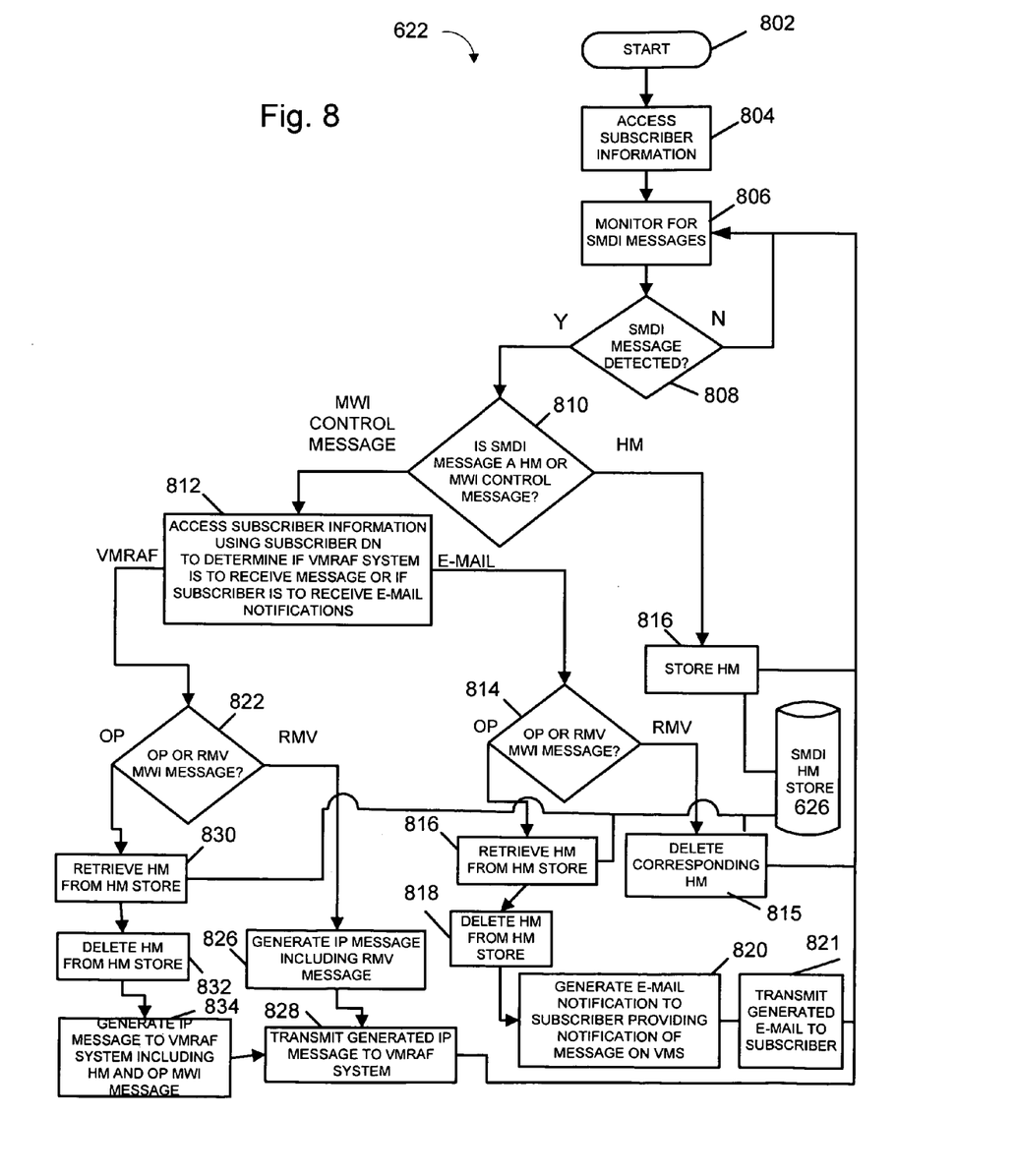
FIG. 8 illustrates a SMDI message server routine used for providing SMDI information using IP messages.

FIG. 8 illustrates an exemplary SMDI message to IP/E-mail message conversion routine 622. The routine 622 begins in step 802 when it is executed by the SMDI message server's CPU 604. Operation proceeds from step 802 to step 804, wherein the set of subscriber information 626 is accessed, e.g., to identify the subscribers who are to be serviced. Then in step 806, the server 460 monitors the SMDI communications link between the VMS 50 and C.O. switch 448 for SMDI messages.

In step 808 a determination is made as to whether or not a SMDI message was detected. If a SMDI message is detected in step 808, operation proceeds to step 810. However, if no SMDI message is detected in step 808, operation proceeds once again to monitoring step 806. In step 810, a determination is made as to whether the detected SMDI message is a SMDI history message (HM) or a SMDI message waiting indicator (MWI) message.

If the received message is a SMDI history message, operation proceeds to step 816 wherein the history message is stored in SMDI message store 626 for future use. Operation proceeds from step 816 to monitoring step 806.

If the received message is determined in step 810 to be a MWI control message, operation proceeds to step 812 wherein the subscriber information 624 is accessed using the DN included in the MSI control message. In step 812, a determination is made as to whether the subscriber to whom the DN corresponds uses a VMRAF system, which should receive the SMDI message, or if the subscriber is to receive an E-mail notification of waiting messages.

If the subscriber is to receive E-mail notifications of waiting messages, operation proceeds to step 814 wherein a determination is made as to whether the received SMDI message is an operate (OP) or remove (RMV) message. If the message is a SMDI RMV message, no E-mail notification needs to be sent to the subscriber and operation proceeds to step 815. In step 815, the HM corresponding to the RMV message, as determined by the DN included in the RMV message, is deleted from the SMDI message store 626 prior to operation returning once again to monitoring step 806.

If an OP message was received, operation proceeds from step 814 to step 816 wherein the stored SMDI history message corresponding to the received OP message, as indicated by the DN in the OP message, is retrieved from the HM store 626. After retrieval, the retrieved HM is deleted from the store in step 818. Then, in 820, the retrieved HM is used to generate an E-mail notification to the subscriber indicated by the OP DN that a voice message was received. The E-mail notification message may include information obtained from the retrieved history message, e.g., the name and telephone number of the calling party as well as subscriber information such as the E-mail address of the subscriber which is obtained from the subscriber information 626.

Figure 9:
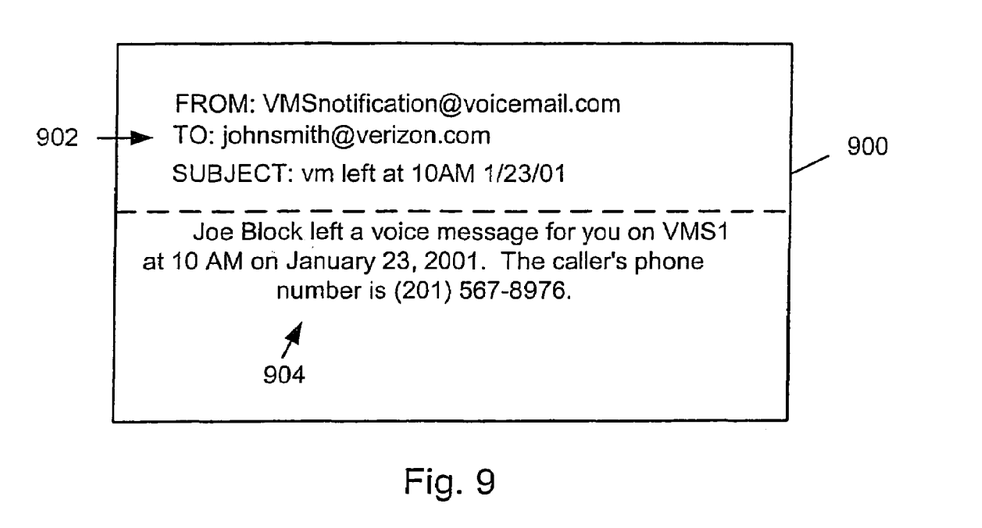
FIG. 9 illustrates a voice message notification E-mail generated in accordance with the present invention.

Referring now to FIG. 9, an example of an E-mail notification message 900 is shown. The message 900 includes in the TO: field 902 the E-mail address of the VMS subscriber. In the message field 904, the message 900 includes the name of the party who left the message, Joe Block, which is obtained from the HM's calling name field 218 and the calling party's telephone number which is obtained from the HM's call DN field 210. Date and time information included in the message 900 may be generated from an internal clock/calendar maintained by the SMDI voice message server.

After generating the E-mail message, in step 821, the E-mail notification message is transmitted to the service subscriber using E-mail routine 620 and the Internet or an intranet. Once the E-mail notification is transmitted, operation returns to monitoring step 806.

If in step 812 it was determined that the subscriber identified by the DN in the received MWI control message is a VMRAF service subscriber, operation proceeds from step 812 to step 822. In step 822 a determination is made as to whether an OP or RMV MWI control message was received.

Figures 10, 11:
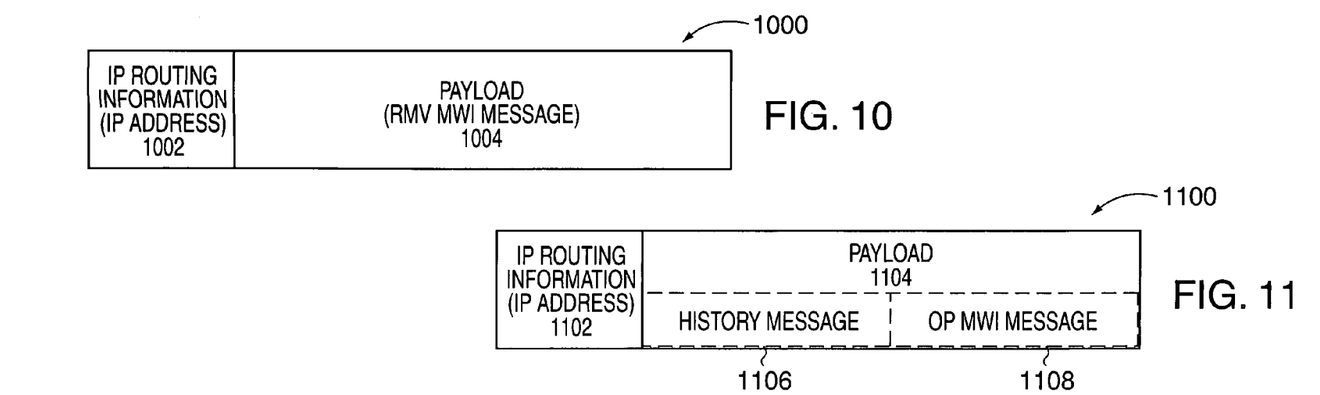
FIGS. 10 and 11 illustrate IP messages including SMDI information generated in accordance with the present invention.

If an RMV MWI message is received, in step 826 an IP message which includes the information from the received RMV message is generated. The IP message includes the IP address of the VMRAF system used by the subscriber identified by the RMV message's DN. In addition, the message includes one or more IP packets used to convey the RMV MWI message information. FIG. 10 illustrates an exemplary message 1000 which includes VMRAF IP routing information 1002 and RMV MWI information as the payload 1004.

Once the IP message 1000 is generated in step 826, operation proceeds to step 828.

If in step 822 it is determined that an SMDI OP MWI message was received, operation proceeds to step 830 wherein the HM corresponding to the OP message is retrieved from the HM store 626. Then, in step 832, the retrieved HM is deleted from the HM store 626. From step 832 operation proceeds to step 834 wherein an IP message directed to the VMRAF system 420, used by the subscriber identified by the OP message DN, is generated.

FIG. 11 illustrates an exemplary IP message 1100 generated in step 834. The message 1100 includes VMRAF information 1102, e.g., the IP address of the VMRAF system 420, and a payload 1104 including history message information 1106 and OP MWI message information 1108. The payload information may be transmitted as one or more IP packets and may include all or only some of the HM and OP MWI information.

From step 834 operation proceeds to step 828 wherein the generated IP message is transmitted to the VMRAF system, e.g., over the Internet 18 or an intranet. Operation proceeds from step 828 to monitoring step 806.

While the FIG. 8 system uses both history message and MWI control messages, a simplified system can be implemented which does not use the SMDI history message. In such a case, the VMRAF system 420 would be forwarded SMDI OP and RMV MWI message information but not SMDI HM information. Also, in such an embodiment, a VMS subscriber who did not use VMRAF system services would be notified by E-mail of a waiting message, but without the identity of the party who left the message being included in the E-mail notification.

In response to OP MWI message information, the VMRAF system 420 will retrieve and forward waiting voice messages as discussed above. In response to the RMV MWI message information the VMRAF system 420 will delete any locally stored copy of a forwarded message corresponding to the subscriber indicated by the DN in the RMV MSI message.

Numerous variations on the above described methods and apparatus are possible without departing from the scope of the invention. For example, the functionality of the VMRAF system can be combined with that of the SMDI message server to create a system which is directly responsive to SMDI messages communicated between a C.O. switch and VMS coupled thereto.

What is claimed is:

1. A communications method, comprising:
   monitoring a SMDI communications link extending between a telephone switch and a voice messaging system to detect at least one of a SMDI history message and a SMDI message waiting indicator message;
   generating an IP message including at least one IP packet, said IP packet including at least some information obtained from a detected SMDI message; and
   transmitting the IP message over a communications channel which supports the transmission of IP packets; and
   in response to detecting said SMDI history message, storing at least some information included in the SMDI history message.

2. The communications method of claim 1, wherein said SMDI communications link includes an RS-232 cable, the method further comprising:
   prior to performing said monitoring step, inserting a tee connection into said SMDI communications link to allow for monitoring of said link.

3. The communications method of claim 1, further comprising:
   in response to detecting a said SMDI message waiting indicator message, performing a database look-up operation to retrieve IP message routing information associated with a directory number included in the detected SMDI message waiting indicator message; and
   wherein the step of generating an IP message includes including at least some of the retrieved IP message routing information in said IP message.

4. The communications method of claim 3, wherein the IP message is an E-mail message and wherein the IP message routing information includes an E-mail address.

5. The communications method of claim 3, wherein said IP message routing information includes an IP address.

6. The communications method of claim 1, further comprising:
   operating an advanced intelligent network service control point to store IP addresses in customer records corresponding to voice mail service subscribers; and
   wherein said step of generating an Internet Protocol message includes incorporating an IP address corresponding to a voice mail service subscriber, obtained from said service control point, into said at least one IP packet.

7. The method of claim 1, wherein the step of generating an IP message includes:
   incorporating at least some of the stored information obtained from the SMDI history message in said IP message.

8. The communications method of claim 6, further comprising:
   in response to detecting a SMDI message waiting indicator control message,
   using directory number information included in the SMDI message waiting indicator control message to retrieve stored SMDI history message information.

9. The communications method of claim 8, wherein the step of generating an IP message includes incorporating at least some of the retrieved IP history message information in said IP message.

10. The communications method of claim 9, wherein at least some of the retrieved IP history message information includes at least one of a calling party name and a calling party telephone number.

11. The communications method of claim 10, wherein said IP message is an E-mail message.

12. The communications method of claim 9, wherein the step of generating an IP message further includes incorporating at least some information from the detected SMDI message waiting indicator control message in said IP message.

13. A method of operating an Internet Protocol messaging device the method comprising:
   receiving Internet Protocol address information and directory number information for each of a plurality of voice mail service subscribers from an advanced intelligent network service control point coupled to said Internet Protocol messaging device;
   receiving a SMDI message;

generating an IP message including at least one IP packet and at least some information obtained from the received SMDI message, said generating including incorporating an Internet Protocol address included in said received Internet Protocol address information in said at least one IP packet; and transmitting the IP message to an IP communications network.

14. The method of claim 13,
wherein the step of receiving a SMDI message includes receiving one of a frequency shift keying and a phase shift keying encoded signals; and
wherein the step of generating an IP message includes the step of including a message waiting indicator control signal obtained from the received SMDI message in said IP message.

15. The method of claim 13, further comprising:
using information in a received SMDI message to access a database including Internet Protocol address information; and
using at least some of the retrieved Internet Protocol address information in said IP message.

16. The method of claim 15,
wherein the Internet Protocol address information includes an E-mail address; and
wherein said IP message is an E-mail message.

17. The method of claim 16, further comprising:
storing at said advanced intelligent network service control point, in each of a plurality of subscriber call processing records, each call processing record corresponding to a voice mail service subscriber, an Internet Protocol address and directory number corresponding to the voice mail service subscriber to which the call processing record corresponds.

18. The method of claim 17, wherein using information in a received SMDI message to access a database including Internet Protocol address information, includes comparing a directory number or message line indicator received in said SMDI message to said directory number information received from the service control point.

19. A communications system, comprising:
a telephone switch;
a voice messaging system;
a communications link coupled to the telephone switch and to the voice messaging system for carrying voice message waiting information between voice messaging system and the telephone switch;
an Internet Protocol message server coupled to said communications link for detecting voice message waiting information transmitted over said communications link and for generating an Internet Protocol message including at least some of said voice message waiting information; and
a voice message retrieval device coupled to said Internet Protocol message server by an Internet Protocol communications channel, the voice message retrieval device including means for retrieving a waiting message from said voice messaging system in response to receiving an IP message including at least some message waiting indicator information.

20. The communications system of claim 19, wherein said voice messaging waiting information is a message waiting indicator control signal.

21. The communications system of claim 20, wherein the Internet Protocol server includes:
means for decoding at least one of a Frequency Shift Keying signal and a Phase Shift Keying signal to generate decoded simplified message desk interface message information.

22. The communications system of claim 19, wherein said communications link is a simplified message desk interface link.

23. The communication system of claim 22, wherein the Internet Protocol server includes:
means for decoding at least one of a Frequency Shift Keying signal and a Phase Shift Keying signal to generate decoded simplified message desk interface message information; and
means for generating an IP message including at least some of said decoded simplified message desk interface message information.

24. The communication system of claim 23, wherein the Internet Protocol message server further includes:
a database of voice message service subscriber information including directory number and Internet Protocol address information.

25. The communication system of claim 19, wherein the Internet Protocol message server further includes:
a database of voice message service subscriber information including directory number and Internet Protocol address information.

26. A message server for generating Internet Protocol (IP) messages from simplified message desk interface messages, the message server comprising:
means for receiving simplified message desk interface messages from a simplified message desk interface data link;
stored Internet address information; and
an Internet Protocol message generation module for generating an Internet Protocol message including IP address information and at least some information obtained from a received simplified message desk interface data said Internet Protocol message generation module including at least a routine for accessing at least a portion of a stored history message to obtain a calling party name.

27. The message server of claim 26, wherein the stored Internet address information includes E-mail addresses of voice message service subscribers.

28. The message server of claim 26, further comprising:
a simplified message desk interface history message store for storing received history messages.

29. A system for providing voice messaging service to a plurality of message service subscribers, the system comprising:
a telephone switch;
a voice messaging system;
a simplified message desk interface communications channel coupling the voice messaging system to the telephone switch;
an Internet Protocol network for communicating messages using the Internet Protocol;
an Internet Protocol message server coupled to the simplified message desk interface communications channel and to the Internet Protocol network, the Internet Protocol message server generating IP messages from simplified message desk interface messages transmitted over said simplified message desk interface communications channel; and a voice message retrieval system coupled to the Internet Protocol message server by said Internet Protocol network, the voice message retrieval system operating to retrieve voice messages from said voice message system in response to Internet Protocol messages received from the Internet Protocol message server.

30. The system of claim 29, further comprising:

a service control point including subscriber service information and subscriber Internet address information; and a data network coupling the service control point to the telephone switch and to the Internet Protocol message server.

31. The system of claim 30, wherein the Internet Protocol message server includes a database of voice message service subscriber Internet address information and directory number information downloaded from the service control point.

32. The system of claim 29, wherein the voice message retrieval system includes:

means for generating an E-mail message including a retrieved voice message; and means for transmitting said E-mail message including the retrieved voice message of a voice mail service subscriber.

\* \* \* \* \*